United States Patent
Kestigian et al.

[11] 4,195,908
[45] Apr. 1, 1980

[54] MAGNETIC MIRROR FOR IMPARTING NON-RECIPROCAL PHASE SHIFT

[75] Inventors: Michael Kestigian, Charlton Depot, Mass.; Robert E. McClure, Locust Valley; Eo Vaher, Huntington Station, both of N.Y.

[73] Assignee: Sperry Corporation, New York, N.Y.

[21] Appl. No.: 905,832

[22] Filed: May 15, 1978

[51] Int. Cl.² ............................................. G02B 5/08
[52] U.S. Cl. .................................... 350/151; 356/350
[58] Field of Search .......................... 356/350; 350/151

[56] References Cited

U.S. PATENT DOCUMENTS

| | | | |
|---|---|---|---|
| 3,514,766 | 5/1970 | Mee et al. | 350/151 |
| 3,651,504 | 3/1972 | Goldberg et al. | 350/151 |
| 3,851,973 | 12/1974 | Macek | 356/350 |
| 3,927,946 | 12/1975 | McClure | 356/350 |
| 3,980,949 | 9/1976 | Feldtkeller | 350/151 |

FOREIGN PATENT DOCUMENTS

7312423  3/1975  Netherlands.

OTHER PUBLICATIONS

Torok et al., "Magnetooptic Color Effects in Bismuth Garnet Domains": *IEEE Transactions on Magnetics*, vol. MAG-14, No. 1, Jan. 1978, pp. 31-32.

Levinstein et al., "Garnets for Bubble Domain Devices", *Bell Lab Record*, vol. 51, No. 7, Jul./Aug., 1973, pp. 209-214.

*Primary Examiner*—John K. Corbin
*Assistant Examiner*—R. A. Rosenberger
*Attorney, Agent, or Firm*—Howard P. Terry

[57] ABSTRACT

A magnetic mirror for imparting a non-reciprocal phase shift to p-polarized light incident thereon. A magneto-optic garnet layer is formed on a first surface of a transparent substrate having a second opposed substantially parallel surface upon which the light is incident. The light upon passing through the magneto-optic garnet layer is non-reciprocally phase shifted as a consequence of the application of a magnetic field to the garnet layer normal to the plane of incidence. Means are arranged adjacent a surface of the garnet layer for reflecting light passing therethrough back through the layer. As a magneto-optic material, monocrystalline bismuth lutetium iron garnet is particularly advantageous for use as the magneto-optic garnet layer.

11 Claims, 2 Drawing Figures

MAGNETIC MIRROR FOR IMPARTING NON-RECIPROCAL PHASE SHIFT

BACKGROUND OF THE INVENTION

The present invention relates to magnetic mirrors for imparting a non-reciprocal phase shift to p-polarized light incident thereon and to magneto-optic materials for use therewith, and more particularly, to such apparatus and materials as utilized for differentially phase shifting contradirectional light waves propagating in a ring laser to produce a discrete difference between the frequencies of the light waves to thereby preclude mode locking.

A ring laser includes an optical cavity having components, such as a plurality of mirrors, adapted to direct light waves introduced into the cavity by an active lasing medium around a closed loop planar path. Oscillatory modes occur at those frequencies for which the closed loop path length is an integral number of light wavelengths. Hence, the contradirectional light waves oscillate at the same frequency when their respective path lengths are equal and at different frequencies when the path lengths are unequal as occurs, for example, when the cavity is rotated about an axis perpendicular to the propagation plane of the light waves. The rotational rate may be measured by extracting from the cavity a small portion of the energy in each light wave by partial transmission through or reflection from one of the cavity forming components. Combining means external to the cavity directs the light waves in colinear relation onto a photodetector which provides an electrical beat frequency signal corresponding to the difference between the light wave frequencies.

The difference frequency is linearly related to rotation rate for comparatively fast rotation but as the rate decreases the relationship becomes non-linear because of coupling between each light wave and a backscattered component of the oppositely propagating wave. As the rotation rate decreases even further, but while still at some finite value, the coupling becomes sufficiently strong to synchronize the contradirectional waves resulting in an abrupt cessation of the beat frequency signal. This frequency synchronizing phenomenon is referred to as mode locking and the corresponding beat frequency or rotational rate at which it occurs is called the mode locking threshold.

Various means have been proposed for imparting a non-reciprocal phase shift to the contradirectional light waves. For example, U.S. Pat. No. 3,927,946 to Mc-Clure shows a magnetic mirror for imparting a non-reciprocal phase shift to incident light. This prior art magnetic mirror utilizes a ferromagnetic material such as iron, nickel or cobalt magnetized normal to the plane of incidence to impart a non-reciprocal phase shift to oppositely directed p-polarized light waves incident thereon. However, bare ferromagnetic material are not suitable for use in applications requiring low loss, such as ring lasers, since their reflection coefficients are not high enough. Accordingly, U.S. Pat. No. 3,927,946 shows the application of a multi-layer dielectric to the surface of the ferromagnetic material in order to enhance reflectivity. The consequence of interposing a multi-layer dielectric reflector between the incident light and the ferromagnetic material of the mirror is to sacrifice attainable frequency bias for an improved loss figure.

U.S. Pat. No. 3,927,946 states that a further embodiment of a non-reciprocal phase shift inducing mirror may be provided by using alternate quarter-wavelength layers of a dielectric and a ferrimagnetic material such as yttrium iron garnet. However, such alternate garnet layer structures are difficult to fabricate reliably to control layer thickness as well as to avoid excessive backscatter at layer interfaces since, except for the first yttrium iron garnet layer, the remaining layers would have to be grown on the previously grown layers. Moreover, yttrium iron garnet exhibits an inherently low phase shifting or biasing capability rendering it inappropriate for use in a ring laser for phase shifting the contradirectional light waves to avoid mode locking.

SUMMARY OF THE INVENTION

In accordance with the present invention, a magnetic mirror is provided for imparting a non-reciprocal phase shift to p-polarized light incident thereon, comprising a transparent substrate having a first optically flat surface for receiving incident light and a second optically flat surface in opposed substantially parallel relation with the first surface thereof. A magneto-optic garnet layer is disposed on the second surface of the substrate, the garnet layer having a third surface in opposed substantially parallel relation with the second surface. Means are provided adjacent the third surface of the garnet layer for reflecting light propagating through the third surface from the garnet layer back through the garnet layer. Further means are provided for applying a magnetic field to the garnet layer directed normal to the plane of incidence of the p-polarized light.

In accordance with a further aspect of the present invention, monocrystalline bismuth lutetium iron garnet is provided as a magneto-optic material. In a preferred embodiment thereof, a layer of monocrystalline bismuth lutetium iron garnet having the formula $(BiLu)_3Fe_5O_{12}$ is formed as an epitaxial layer on a substrate of gadolinium gallium garnet.

DESCRIPTION OF THE PREFERRED EMBODIMENTS

Figure 1:
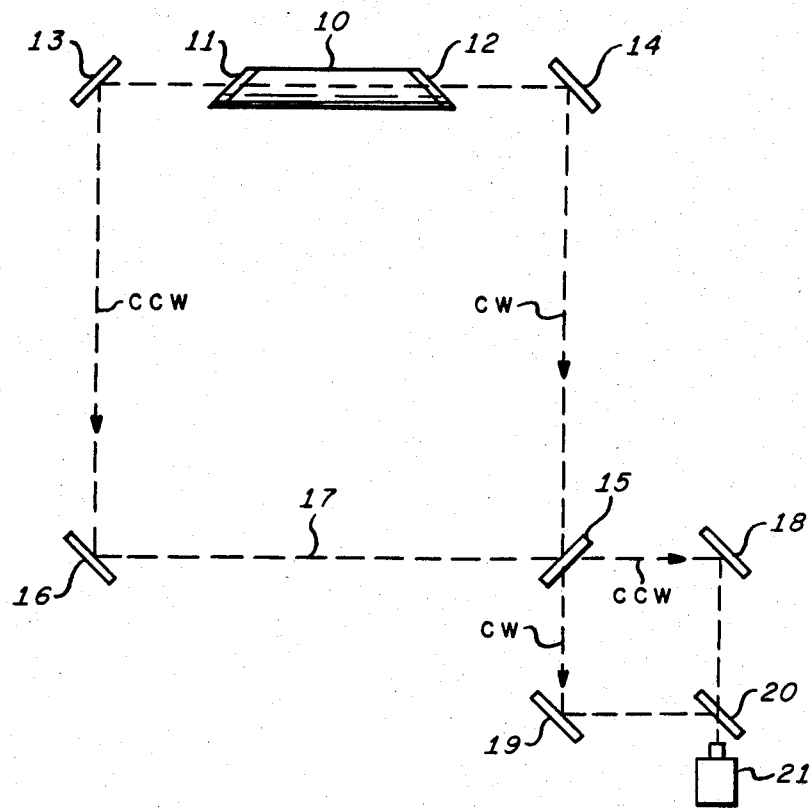
FIG. 1 is a schematic of an active ring laser optical cavity.

Referring to FIG. 1, an active lasing medium, such as a standard He-Ne gas mixture energized by conventional rf means (not shown), contained within glass tube 10 emits light waves in both directions along its longitudinal axis through optical flats 11 and 12 sealing the ends of the tube. Optical cavity forming mirrors 13, 14, 15 and 16 successively reflect the contra-directional light waves around a closed loop path 17. The optical flats are inclined at Brewster's angle with respect to the longitudinal axis of tube 10 to provide light waves plane polarized parallel to the plane of the optical cavity. Accordingly, when the light waves are incident on mirrors 13, 14, 15 and 16, they are polarized in the plane of incidence in each case.

A measure of the difference between the frequencies of the contradirectional light waves resulting from non-reciprocal effects present in the optical cavity is obtained by transmitting part of the energy in each beam through corner mirror 15 to a combiner mechanism comprising mirrors 18 and 19, beam splitter 20 and photodetector 21. The component of the clockwise (cw) lightwave transmitted through corner mirror 15 is first reflected from combiner mirror 19 and then partially reflected from beam splitter 20 onto the photodetector 21. Likewise, the portion of the counterclockwise (ccw) wave extracted from the cavity is reflected from combiner mirror 18 and partially transmitted through the beam splitter in colinear relation with the clockwise wave onto photodetector 21 wherein the light waves mix to produce a beat frequency signal equal to the difference between their frequencies.

To overcome mode locking which occurs at low rotational rates, a non-reciprocal phase shifting effect is incorporated in the optical cavity by means of a magnetic field established in corner mirror 16. The magnetization in the corner mirror interacts with the incident contradirectional waves in such a manner that a differential phase shift is imparted to the waves in the process of being reflected from the mirror. As a result, the contradirectional waves oscillate at different frequencies so that mode locking does not occur even when the optical cavity is stationary. The magnetization in the corner mirror is oriented perpendicular to the plane of the optical cavity and the light waves are polarized in the plane of incidence thereof with mirror 16. These conditions of polarization and magnetization provide the desired differential phase shift while simultaneously preserving the polarization of the light waves.

Figure 2:
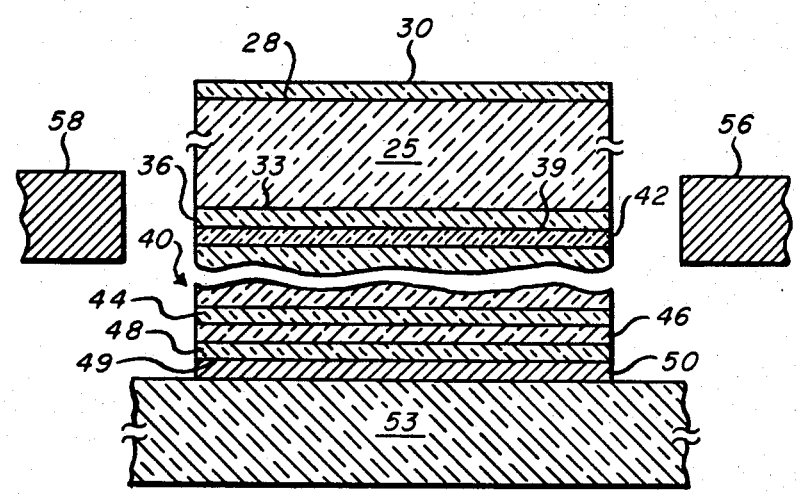
FIG. 2 is a cross sectional view of a preferred embodiment of a magnetic mirror in accordance with the present invention.

With reference to FIG. 2, magnetic mirror 16 has a transparent substrate 25 comprised, for example, of monocrystalline gadolinium gallium garnet. On optically flat surface 28 of substrate 25 is deposited an antireflective coating 30, such as thorium fluoride. Light propagating in closed loop path 17 is incident on antireflective coating 30. Accordingly, substantially all of this light incident on coating 30 will pass through coating 30 and substrate 25 to a second surface 33 of substrate 25 which is optically flat and in opposed substantially parallel relation with surface 28 thereof. A layer 36 of magneto-optic garnet material, such as monocrystalline bismuth lutetium iron garnet, is formed on surface 33 by liquid phase epitaxy. Accordingly, it is necessary that the portion of substrate 25 which forms surface 33 thereof consist of monocrystalline material having the same lattice structure as garnet layer 36. A surface 39 of garnet layer 36 is arranged in opposed substantially parallel relation with surface 33. Formed on surface 39 is a multilayer dielectric reflector 40 including dielectric layers 42, 44, 46 and 48. Multilayer dielectric reflector 40 is formed of 7 to 9 quarter wavelength dielectric layers of alternately high and low refractive index materials, such as cryolite and zinc sulfide, or thorium fluoride and zinc sulfide. Multilayer dielectric 40 has a surface 49 in opposed substantially parallel relation with surface 39 of garnet layer 36. On surface 49 is formed a layer 50 of metal, such as gold, to enhance the reflectivity of magnetic mirror 16. It is important that layer 48 be formed of a low refractive index dielectric such as cryolite or thorium fluoride.

Moreover, the thickness of layer 48 should be adjusted in order to cancel the effect of the complex component of the effective surface reflection coefficient of gold layer 50. A protective glass plate 53 is cemented to metal layer 50 with an optical cement to prevent distortion of multilayer dielectric reflector 40 and metal layer 50, the cement being of a type which does not harden totally in order to avoid warping substrate 25.

An electromagnet having poles 56 and 58 is arranged adjacent garnet layer 36 to induce a saturating magnetic bias field therein having a direction normal to the plane of incidence of light propagating in path 17. Means (not shown) are provided for periodically reversing the direction of the field induced by the electromagnet in order to compensate for drift effects. Most of the light incident on antireflective layer 30 will pass through layer 30 and substrate 25 to magneto-optic garnet layer 36 where, as a result of the magnetic field therein, the light will be subjected to a phase shift which is non-reciprocal, while the plane polarization of the light will be unaffected. As thus phase shifted, substantially all of this light will be reflected back through garnet layer 36 by multilayer dielectric reflector 40 and metal layer 50, such that it will again be phase shifted upon returning through garnet layer 36, whereupon it will exit magnetic mirror 16 through substrate 25 and antireflective layer 30.

The construction of magnetic mirror 16 of FIG. 2 begins with the formation of magneto-optic garnet layer 36 on surface 33 of substrate 25 by liquid phase epitaxy as described hereinbelow. Then antireflective layer 30 of thorium fluoride is deposited on surface 28 of substrate 25 by conventional vacuum deposition techniques, followed by successive vacuum depositions of the alternate dielectric layers of multilayer dielectric reflector 40. In accordance with known techniques, care is taken to insure that the dielectric layers of reflector 40, as well as antireflective coating 30 and garnet layer 36 have low absorption as well as low scattering.

The portion of substrate 25 forming surface 33 must be monocrystalline and have the same structure as magneto-optic garnet layer 36 so that the latter may be formed on surface 33, for example, by liquid phase epitaxy. It is preferable, moreover, that the lattice constant of the portion of substrate 25 forming surface 33 be as close as possible to that of garnet layer 36. While garnet layer 36 may nevertheless be successfully formed on surface 33 although the lattice constant thereof is somewhat different from that of layer 36, such a condition results in a compressive or tension stress in the crystalline structure which in time will lead to cracking and peeling of layer 36 from surface 33. The preferred garnet composition for layer 36 is bismuth lutetium iron garnet $(BiLu)_3Fe_5O_{12}$ which has a lattice parameter $a_o$ of 12.383 angstroms. The preferred substrate material for use with bismuth lutetium iron garnet is gadolinium gallium garnet $Gd_3Ga_5O_{12}$ having a lattice parameter $a_o$ of 12.383 angstroms.

A substrate of monocrystalline gadolinium gallium garnet approximately 0.5 mm thick is prepared for liquid phase epitaxial growth of a bismuth lutetium iron garnet layer in a liquid solution by providing an optically flat growth surface thereof for the epitaxial layer. This surface must be clean of dust or any other foreign substance which would affect the growth surface or introduce defects in the epitaxial layer which may lead to scattering centers. Prior to the actual epitaxial growth step, care must be taken to avoid etching of the growth surface or nucleation thereof by permitting the growth surface to remain in proximity to the liquid solution for an excessively long period while the substrate temperature is reaching equilibrium with that of the liquid solution.

The liquid solution is a lead oxide (PbO) solution of bismuth oxide ($Bi_2O_3$), iron oxide ($Fe_2O_3$) and lutetium oxide ($Lu_2O_3$). The ratio of the amount of lead oxide to that of the solute constituents is chosen such that a desired growth rate is achieved within a range of growth temperatures in which the garnet phase is stable. The ratio of the amount of bismuth oxide to lutetium oxide is adjusted so that the epitaxial garnet layer grown therefrom will have a bismuth to lutetium ratio matching the lattice of the substrate. The ratio of the amount of iron oxide to that of bismuth oxide and lutetium oxide is adjusted so that the garnet phase is stable under the conditions at which the epitaxial garnet layer is grown. The selected amounts of lead oxide, bismuth oxide, iron oxide and lutetium oxide are measured in grams to the second decimal point, mixed in a platinum container, and melted therein at 900° to 1000° C.; then the container with its liquid contents is transferred to a liquid phase epitaxial furnace wherein it is held at a temperature of 1150° C. long enough to completely dissolve these amounts in a liquid solution. The solution must not be allowed to solidify before the epitaxial garnet layer is grown.

When it is desired to grow the epitaxial layer, the temperature of the liquid solution is first reduced to an equilibrium temperature about 20° C. above that at which growth is to take place. Thereafter, the temperature of the liquid solution is reduced to the desired growth temperature. Then the substrate is introduced into the liquid phase epitaxial furnace at a rate sufficiently slow to avoid damage to the substrate. The substrate is held in a horizontal position by a platinum support while in the furnace and held back to back with a second substrate so that growth takes place on only one surface of each substrate. The substrates are then held approximately 3 to 6 mm above the surface of the liquid solution for about 10 minutes such that the temperature of the substrates comes within 1° C. of that of the liquid solution prior to the growth step. The substrates should not remain in this position for an excessive amount of time to avoid etching or nucleation thereof as mentioned above. Then the growth step is commenced by immersing the substrates in the liquid solution to a depth of about 1 cm while they are rotated at 60 rpm with the sense of rotation being reversed every two seconds. After a predetermined period of time, the substrates are drawn from the liquid solution and held just above the surface thereof while they are rotated rapidly to drive off any solution which remains on them. Thereafter, the substrates are removed from the heat zone of the furnace slowly enough so that they are not damaged. If it is then desired to grow further epitaxial garnet layers from this liquid solution, its temperature is then raised to about 1150° C. for 1 to 2 hours before repeating the process.

The liquid solution must be completely homogenous and clear (no precipitation). The temperature thereof during growth must not be so high that the substrate surface etches back, with the consequence that the epitaxial layer exhibits poor optical quality. Moreover, the temperature of the liquid solution must not be so cold that nucleii form, resulting in poor epitaxial growth, and ultimately in poor optical performance of the magnetic mirror. The temperature of the liquid solution during growth should be held within a range of 1° to 2° C. of the predetermined growth temperature since bismuth and lutetium have different segregation coefficients as a function of temperature. That is, in order to achieve the desired ratio of bismuth to lutetium in the epitaxial garnet layer, it is desirable that growth thereof be an isothermal process.

Satisfactory magneto-optic bismuth lutetium iron garnet layers for use in a magnetic mirror as a frequency biasing element in a ring laser gyroscope have been made using the above procedure In one exemplary procedure, a liquid solution was formed of the following constituent amounts: lead oxide (PbO), 239.99 grams; bismuth oxide ($Bi_2O_3$), 197.96 grams; iron oxide ($Fe_2O_3$), 24.51 grams; and lutetium oxide ($Lu_2O_3$), 3.24 grams. These amounts were measured to two decimal places and then prepared in a platinum container as described above. For twenty minutes prior to introduction of the substrates into the furnace the temperature of this liquid solution was lowered to 815° C. in order to achieve equilibrium at that temperature. Then its temperature was reduced to a growth temperature of 785° C. and not permitted to fall below this temperature. The substrates were immersed in the solution for ten seconds and then drawn therefrom resulting in a garnet epitaxial layer approximately 1317 angstroms thick.

In a further exemplary procedure, a liquid solution was formed of the following constituent amounts: lead oxide (PbO), 239.99 grams; bismuth oxide ($Bi_2O_3$), 197.96 grams; iron oxide ($F_2O_3$), 24.51 grams; and lutetium oxide ($Lu_2O_3$), 2.24 grams. At a growth temperature of 780° C., an epitaxial garnet layer having a thickness of approximately 1350 angstroms was grown in one and one half minutes.

The period of growth is normally chosen within the range of about 3 seconds to one minute and a half. The lower limit of 3 seconds is selected as the minimum period of growth which may be timed to achieve reproducible epitaxial layer thickness and which avoids unacceptable optical scatter effects in the epitaxial layer. The upper limit is selected to avoid the undesirable effects of temperature fluctuations during the growth period. That is, the duration of growth must be limited such that significant temperature fluctuations are not likely to occur during growth.

Preferably the epitaxial garnet layer is grown to a predetermined thickness such that the distance travelled by the light passing therethrough is approximately equal to one quarter of its wavelength in the garnet layer. This will result in maximum attainable bias since bias is a sinusoidal function of the thickness of the magneto-optic garnet layer. The thickness of the garnet layer may be controlled to a degree by careful selection of the parameters of growth; however, thickness thereof may be controlled more precisely by growing the garnet epitaxial layer thicker than ultimately desired and then etching it back to that desired thickness.

While it is seen that the present invention is particularly advantageous as a frequency biasing element for use in an active ring laser gyroscope to overcome the mode-locking phenomenon, it will be appreciated that it is useful for any similar application requiring non-reciprocal phase shifting of coherent light beams. In particular, the present invention may be incorporated as a corner mirror for use in a passive ring laser gyroscope to induce non-reciprocal frequency biasing of contradirectional light beams to avoid mode locking.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A magnetic mirror for imparting a non-reciprocal phase shift to p-polarized light incident thereon, comprising:
a transparent substrate having a first optically flat surface for receiving incident light and a second optically flat surface in opposed substantially parallel relation with the first surface thereof;
a magneto-optic garnet layer on the second surface of said substrate, said garnet layer having a third surface in opposed substantially parallel relation with said second surface;
means adjacent the third surface of said garnet layer for reflecting light propagating through the third surface from said garnet layer back through said garnet layer; and
means for applying a magnetic field to said garnet layer directed normal to the plane of incidence of the p-polarized light.

2. The magnetic mirror of claim 1, wherein at least that portion of said substrate which forms the second surface consists of a monocrystalline material having the same lattice structure and substantially the same lattice constant as said magneto-optic garnet layer, and said magneto-optic garnet layer is grown on the second surface of said substrate.

3. The magnetic mirror of claim 2, wherein said magneto-optic garnet layer comprises a monocrystalline layer of bismuth lutetium iron garnet.

4. The magnetic mirror of claim 3, wherein the portion of said substrate forming the second surface thereof consists of monocrystalline gadolinium gallium garnet.

5. The magnetic mirror of claim 4, wherein said bismuth lutetium iron garnet layer is formed on the second surface by liquid phase epitaxy.

6. The magnetic mirror of claim 1, wherein said means for reflecting light comprises a multilayer dielectric reflector.

7. The magnetic mirror of claim 6, wherein said multilayer dielectric reflector comprises alternate layers of zinc sulfide and thorium fluoride.

8. The magnetic mirror of claim 6, wherein said multilayer dielectric reflector comprises alternate layers of zinc sulfide and cryolite.

9. The magnetic mirror of claim 6, wherein said multilayer dielectric has a fourth surface in opposed substantially parallel relation with the third surface, and said means for reflecting light further comprises a layer of gold deposited on the fourth surface whereby reflectivity of said means for reflecting light is enhanced.

10. The magnetic mirror of claim 1, further comprising an antireflective coating on the first surface of said substrate.

11. The magnetic mirror of claim 10, wherein said antireflective coating comprises a layer of thorium fluoride.

* * * * *